United States Patent
Oh et al.

(10) Patent No.: US 12,494,178 B1
(45) Date of Patent: Dec. 9, 2025

(54) INFORMATION HANDLING SYSTEM DISPLAY LOW BLUE LIGHT IMAGE PRESENTATIONS BY END USER IDENTIFICATION

(71) Applicant: Dell Products L.P., Round Rock, TX (US)

(72) Inventors: Guentaek Oh, Singapore (SG); Yonggu Kang, Singapore (SG); Seong Yong Kim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/036,633

(22) Filed: Jan. 24, 2025

(51) Int. Cl.
  *G09G 3/34* (2006.01)
  *G02F 1/1335* (2006.01)
  *G02F 1/13357* (2006.01)
  *G09G 3/36* (2006.01)

(52) U.S. Cl.
  CPC ..... *G09G 3/3413* (2013.01); *G02F 1/133603* (2013.01); *G02F 1/133612* (2021.01); *G09G 3/3611* (2013.01); *G09G 2320/064* (2013.01); *G09G 2354/00* (2013.01)

(58) Field of Classification Search
  CPC .............. G09G 3/3413; G09G 3/3611; G09G 2320/064; G09G 2354/00; G09G 3/34; G02F 1/133603; G02F 1/133612
  See application file for complete search history.

(56) References Cited

U.S. PATENT DOCUMENTS

| | | | |
|---|---|---|---|
| 8,873,853 B2 | 10/2014 | Rodriguez | |
| 2007/0205969 A1* | 9/2007 | Hagood | G02B 26/02 345/84 |
| 2013/0050279 A1* | 2/2013 | Feng | G09G 3/3611 345/102 |
| 2013/0050293 A1* | 2/2013 | Feng | G02F 1/133603 345/87 |
| 2020/0143758 A1* | 5/2020 | Lu | G09G 3/3607 |

OTHER PUBLICATIONS

Tüvrheinland, "Eye Comfort Certification," downloaded from https://www.tuv.com/usa/en/eye-comfort.html#:~:text=Blue%20light%20is%20a%20short,find%20Eye%20Comfort%20Certified%20devices? on Jul. 28, 2025, 6 pages.

\* cited by examiner

*Primary Examiner* — Pegeman Karimi
(74) *Attorney, Agent, or Firm* — Zagorin Cave LLP; Robert W. Holland

(57) ABSTRACT

An information handling system display presents visual images with LED backlights to provide illumination through a liquid crystal display (LCD) panel having an array of pixels. The backlight includes a first blue LED that illuminates in a first blue light spectrum, such as approximately 450 nm, and a second blue LED that illuminates in a second blue light spectrum, such as greater than or equal to 460 nm. The blue lights provide different proportions of backlight based upon the age of an end user viewing the display, such as a greater proportion of longer blue wavelengths when the age is below a threshold and a shorter blue wavelength when the age is above a threshold.

20 Claims, 4 Drawing Sheets

INFORMATION HANDLING SYSTEM DISPLAY LOW BLUE LIGHT IMAGE PRESENTATIONS BY END USER IDENTIFICATION

BACKGROUND OF THE INVENTION

Field of the Invention

The present invention relates in general to the field of information handling system displays, and more particularly to an information handling system display low blue light image presentations by end user identification.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with a processor that executes instructions in cooperation with a memory that stores the instructions and information. Stationary information handling systems, such as desktop, tower and server configurations, integrate processing components in a housing that operates at a fixed location with external resources, such as a power outlet and peripheral input devices. For instance, a typical stationary information handling system interfaces with a peripheral display to present information as visual images, a peripheral keyboard to accept key inputs and a peripheral mouse to accept cursor movement inputs. Portable information handling systems integrate the processor, memory, display, keyboard and a battery power source in a portable housing to support mobile operations. Portable information handling systems allow end users to carry a system between meetings, during travel, and between home and office locations so that an end user has access to processing capabilities while mobile. In addition to these integrated input/output devices, portable information handling systems will also typically interact with peripheral devices, such as a peripheral display.

Typical information handling system displays have a flat panel configuration to reduce the display thickness and weight. One type of flat panel display is a liquid crystal display (LCD) that presents images by changing the orientation of liquid crystals in a display panel to adjust the color of light that passes through the display panel from a backlight located behind the display panel. A typical LCD backlight uses light emitting diode (LED) illumination that is diffused evenly behind the LCD panel. Generally, LCD backlights attempt to output white light by combining different colored LED's, such as red, green and blue light producing LEDs. One concern with display backlights is associated with the use of blue spectrum light, which can have negative impacts on end users with increased eye tiredness and difficulty sleeping. Generally, blue light tends to be more harmful to children than adults in that children who have not fully developed will have 15% of blue light reach their retina compared with only 1% for adults. Another difficulty with low blue light implementations is that blue light spectrum associated with fewer negative health impacts tends to have a higher power consumption than more harmful blue light spectrums due to the longer wavelength LED design.

SUMMARY OF THE INVENTION

Therefore, a need has arisen for a system and method which manages blue light output by a display backlight based on viewer age.

In accordance with the present invention, a system and method are provided which substantially reduce the disadvantages and problems associated with previous methods and systems to manage display image presentations with a backlight. A backlight includes a switchable LED wavelength design to present visual images with a greater proportion of shorter versus longer blue wavelength light when an adult above an age threshold views the display and a lesser proportion of shorter versus longer blue wavelength when a child below the age threshold views the display.

More specifically, an information handling system processes information with a processor that executes instructions in cooperation with a memory that stores the instructions and information. The information is presented at a display as visual images defined in an array of pixels and illuminated by an LED backlight having first and second blue LEDs that generate illumination with a first shorter blue wavelength, such as 450 nm, and a second longer blue wavelength, such as 456 nm or greater. When an end user viewing the display has an age greater than a threshold, the backlight illuminates the display with a first proportion of short to long blue wavelengths, such as 50% PWM of LEDs that generate 450 nm blue light and 50% PWM of LEDs that generate 456 nm or greater of blue light. When an end user viewing the display has an age of less than the threshold, the backlight illuminates the display with a second proportion of short to long blue wavelengths, such as 10% PWM of LEDs that generate 450 nm blue light and 90% PWM of LEDs that generate 456 nm or greater blue light. Alternatively, constant current LEDs may be used with different numbers of long versus short wavelength LEDs used to generate the backlight illumination.

The present invention provides a number of important technical advantages. One example of an important technical advantage is that a display backlight changes a mixture of blue wavelength illumination to improve eye viewing safety and manage system power use. When an adult above an age threshold views the display, a greater proportion of short wavelength blue light by the backlight reduces power use with less risk of adverse effects on the adult since adults absorb less blue light than children. When a child below the age threshold views the display, a greater proportion of long wavelength blue light by the backlight reduces the adverse effect of the blue light where a child tends to absorb more blue light but the longer wavelength improves safety over the shorter wavelength. The balance of viewing safety and power use is achieved with minimum impacts on performance where a camera recognizes an end user age and applies the age to define the blue light output.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display manages presentation of visual images with a backlight that adjusts a mixture of blue wavelength based upon an age of a viewer of the display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
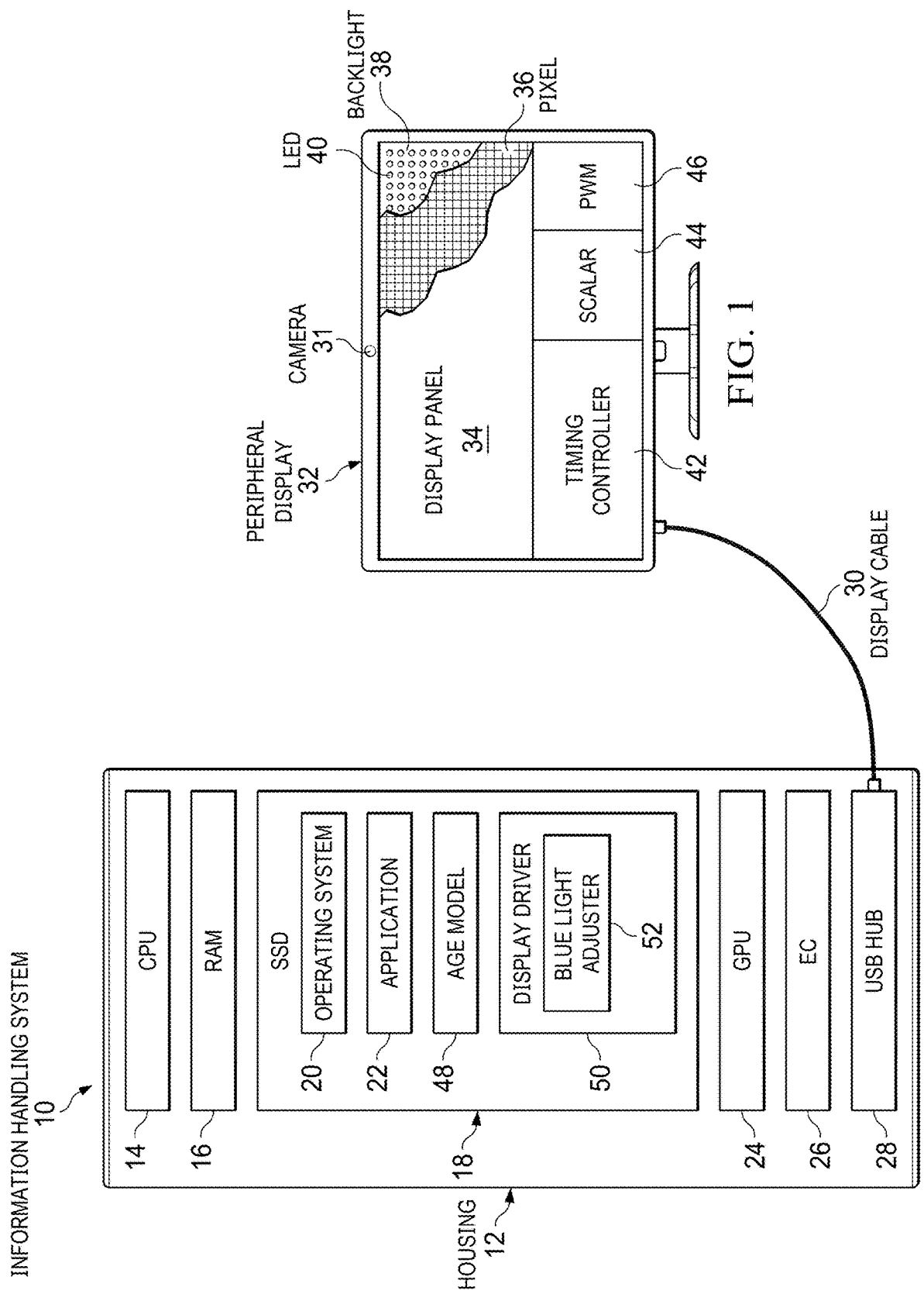
FIG. 1 depicts a block diagram of an information handling system interfaced with a display that manages blue light wavelength of a backlight used for image presentation based upon an age of a viewer of the display.

Referring now to FIG. 1, a block diagram depicts an information handling system 10 interfaced with a display 32 that manages blue light wavelength of a backlight used for image presentation based upon an age of a viewer of the display. Information handling system 10 processes information with processing components coupled in a housing 12. In the example embodiment, housing 12 has a stationary configuration that presents information as visual images at a peripheral display 32. In an alternative embodiment, information handling system 10 may have a portable configuration that integrates display 32 into housing 12 and also interfaces with a peripheral display. A central processing unit (CPU) 14 executes instructions to process information in cooperation with a random access memory (RAM) 16 that stores the instructions and information. A solid state drive (SSD) 18 provides non-transient memory that stores instructions and information during power down of the system. For example, an operating system 20 coordinates interactions between processing components and supports execution of applications 22. A graphics processing unit (GPU) 24 interfaces with CPU 14 to further process information to define visual images, such as by defining pixel values that are communicated to peripheral display 32 through a display cable 30. An embedded controller 26 manages operational conditions within housing 12, such as application of power and interactions with peripheral devices. A USB hub 28 manages communication with external devices through USB communications.

Information handling system 10 presents information as visual images by generating pixel values that are communicated through a display cable 30 to a timing controller 42 and scanned to an array of pixels 36 of a display panel 34. A scalar 44 has a processing resource and non-transitory memory to manage operations at display 32, such as the resolution of visual images scanned by timing controller 42. Scalar 44 also manages operation of a backlight 38 that illuminates behind display panel 34 to present the visual images. In the example embodiment, light emitting diodes (LEDs) 40 provide a white light illumination that red, green and blue liquid crystal material selectively passes to define colors at pixels 36. LEDs 40 combine red, green and blue light to generate the white light with the intensity of the white light managed through pulse width modulation (PWM) signals provided from a PWM module 46 under the control of scalar 44.

In the example embodiment, LEDs 40 include two or more types of blue LEDs that generate blue light in two or more different wavelength/frequency spectrums. A shorter blue light wavelength, such as 450 nm, is produced with a first LED type that uses less energy than a second LED type having a longer wavelength, such as greater than 460 nm. The longer blue light wavelength is generated by a less efficient LED, however, the longer blue light tends to have fewer negative effects on end users viewing the display than does the shorter blue light wavelength. Scalar 44 commands changes in the mixture of blue light spectrums with PWM module 46 based upon an age of an end user viewing display 32. For example, a camera 31 monitors the viewing area of the display to identify end users viewing the display and determine their age. In one example embodiment, facial identification is used to identify the end user and compare the end user to a list of known end users and their ages. Scalar 44 then commands PWM module 46 to use a greater mix of shorter wavelength blue light when the age is above a threshold and a greater mix of longer wavelength blue light when the age is below a threshold. When an end user age is not known, an age model 48 running on information handling system 10 analyzes the end user face to estimate the age and a blue light adjuster 52 of a display driver 50 configures display 32 to adjust the blue light spectrum mixture as appropriate based on the end user age.

Figure 2:
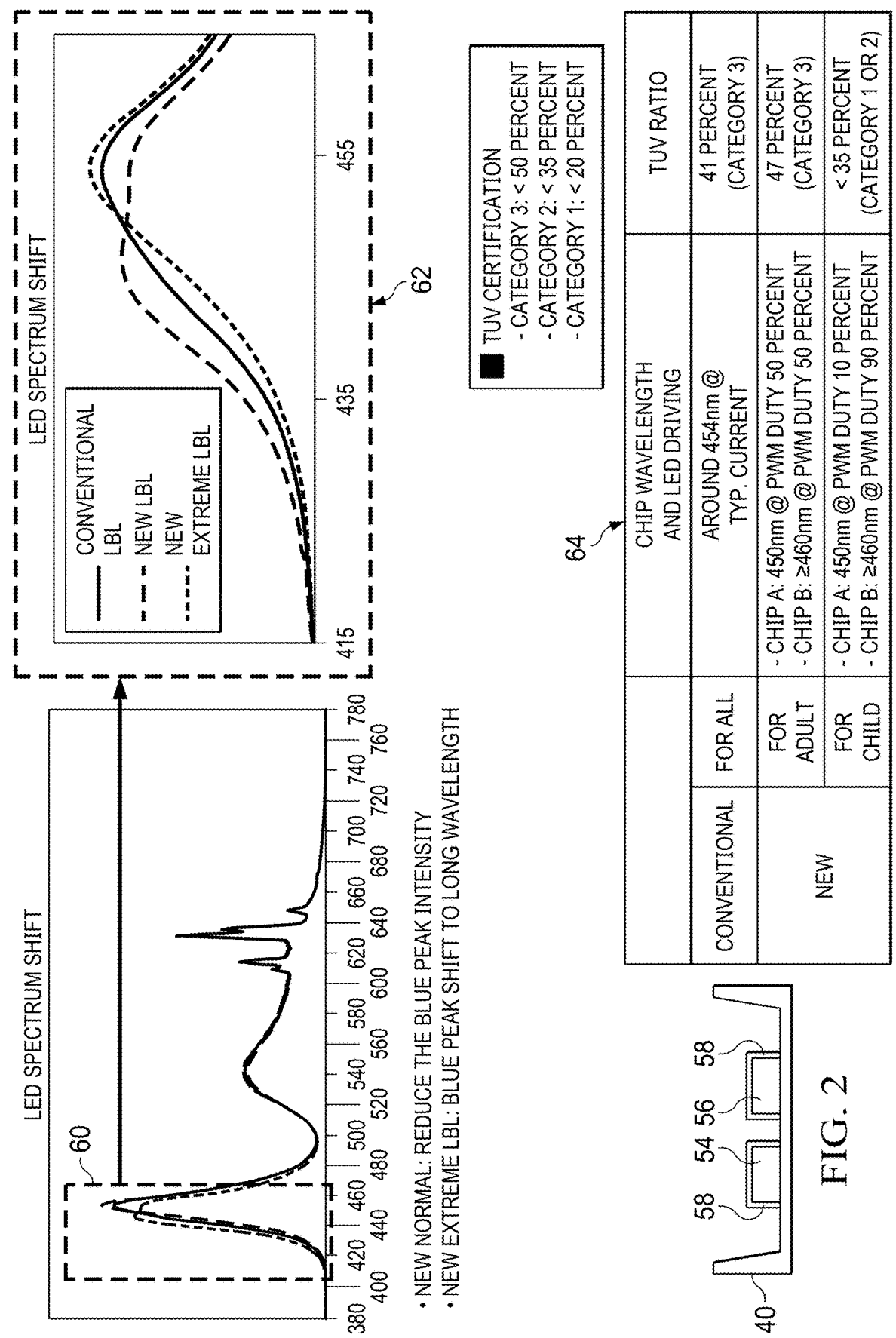
FIG. 2 depicts an example embodiment of a backlight configured with LEDs to support different proportions of blue light having first and second wavelengths.

Referring now to FIG. 2, an example embodiment depicts a backlight configured with LEDs to support different proportions of blue light having first and second wavelengths. In the example embodiment, LED 40 is a package having first and second blue LED elements 58. A first blue LED 54 generates illumination at approximately 450 nm with a first phosphor layer. A second LED 56 generates illumination at equal or greater than 460 nm with second phosphor layer.

The blue LEDs are encapsulated in silicon within the package so that illumination is dispersed and spread in a conventional manner so that illumination at the different wavelengths leaves LED 40 with an appropriate even mixture. Graph 60 shown in detail by graph 62 illustrates the distribution of blue light spectrum in the illumination generated by LED 40. Conventional LED backlight illumination peaked at 454 nm or less. To reduce the impact of blue light, an attempt has been made to spread the blue light spectrum with a peak at a shorter wavelength using LEDs with lower power consumption. In the present example embodiment, blue light negative impacts are reduced by instead having the blue light spectrum peak at a longer wavelength. Table 64 tabulates example output of conventional and new blue light LEDs with associated TUV ratios and categories. Since adults receive less blue light as a percentage of blue light presented, the impact for adults is reduced and shorter blue light wavelengths with associated improved power efficiency are used with an even mixture provided by a 50% PWM of both the short and long blue light LED elements. Since children receive a greater percentage of blue light, a 90% PWM of the longer blue light wavelength LED mixed with a 10% PWM of the shorter blue light wavelength LED provides a lower TUV at the price of greater power consumption.

Figure 3A:
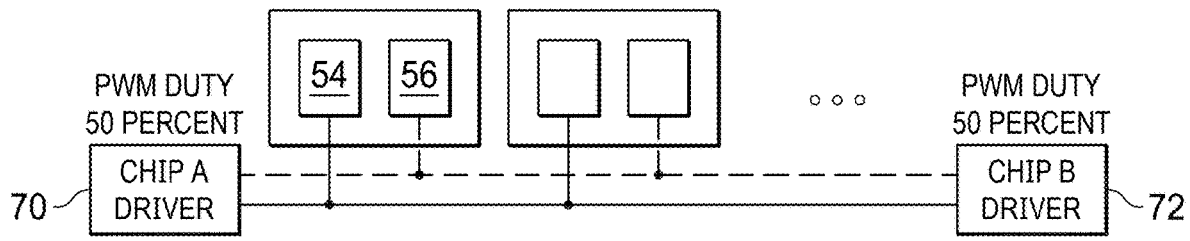
FIGS. 3A and 3B depict an example backlight that illuminates with a first proportion of longer blue wavelength for adult viewers versus a second proportion for child viewers.
Figure 3B:
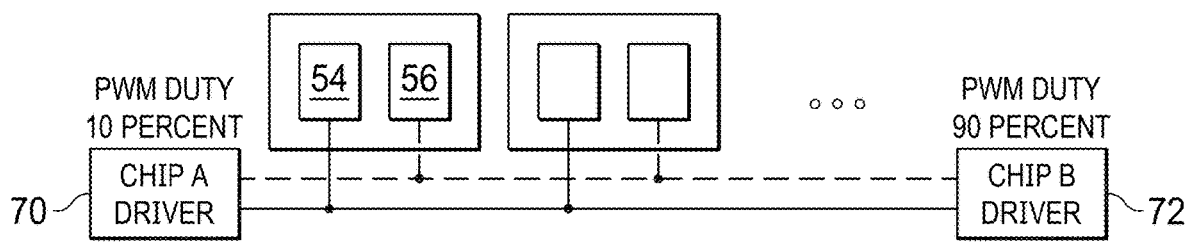

Referring now to FIGS. 3A and 3B, an example backlight is depicted that illuminates with a first proportion of longer blue wavelength for adult viewers versus a second proportion for child viewers. FIG. 3A depicts the backlight with a first PWM driver 70 that powers blue light LEDs 54 at 450 nm and a second PWM driver 72 that powers blue light LEDs 56 at 456 nm or greater. In FIG. 3A both the first and second PWM drivers command a 50% duty cycle so that the mixture of light at the backlight is half in the 450 nm spectrum and half in the 456 or greater spectrum, thereby providing a backlight appropriate for adults with a reduced power consumption. In contrast, FIG. 3B depicts the first and second PWM drivers configured to present a backlight appropriate for children. The first PWM driver 70 provides a 10% PWM duty cycle to the 450 nm LEDs 54 while the second PWM driver 72 provides a 90% PWM duty cycle of 456 nm or greater LEDs 56 so that the mixture of blue light spectrum from the backlight is 90% long wavelength blue light and 10% short wavelength blue light. Although the example embodiment adjusts the blue light mixture with a pulse width modulation to change the amount of power to the respective LEDs, an alternative embodiment might use a constant current at each LED and change the mixture of long and short wavelength blue light by changing the number of blue LEDs in each wavelength that receive constant current versus no current. For instance, the 90/10 mixture of FIG. 3B may be accomplished by a constant current to 9 long wavelength blue LEDs and a constant current to 1 short wavelength blue LED. In various embodiments, the mixtures may of blue light wavelengths may have different percentages across different ages based upon blue light absorption at the different ages.

Figure 4:
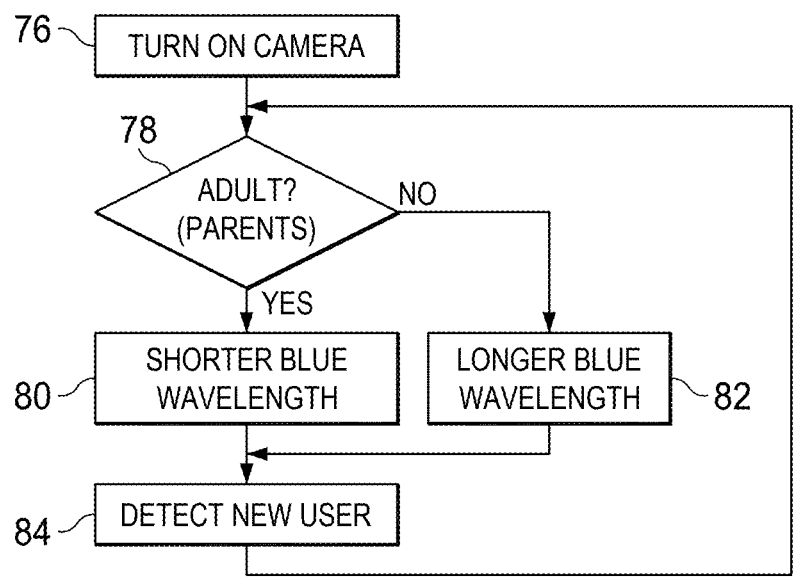
FIG. 4 depicts a flow diagram of a process for transitioning between different proportions of blue wavelength light at a backlight in response to an end user age.

Referring now to FIG. 4, a flow diagram depicts a process for transitioning between different proportions of blue wavelength light at a backlight in response to an end user age. The process starts at step 76 with power on to the camera when an end user views the display. At step 78 a determination is made with the camera of an age of the end user, such as by performing facial identification of known end users or evaluating facial considerations of unknown end users to estimate age. When the end user is an adult, meaning of an age of greater than a threshold age, the process continues to step 80 to use a greater proportion of shorter wavelength blue light, such as a 50/50 mixture of short and long wavelength blue light. When the end user is a child, meaning of an age less than a threshold age, the process continues to step 82 to a greater proportion of longer wavelength blue light, such as a 90/10 mixture of long and short wavelength blue light. In various embodiments, additional mixtures may be provided at different age ranges. At step 84, when a new end user is detected the process returns to step 78 to determine the age of the end user and adjust the backlight mixture of blue short and long wavelength illumination as appropriate.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions that process information;
   a memory interfaced with the processor and operable to store the instructions and information; and
   a display interfaced with the processor and having a liquid crystal display panel operable to generate visual images with an array of liquid crystal pixels illuminated by a backlight, the backlight having plural light emitting diodes (LED) to generate illumination including at least a first blue LED illuminating in a first blue spectrum and a second blue LED illuminating in a second blue spectrum, the display further having a scalar that commands the first and second blue LEDs to adjust a proportion of blue light output from the first and second blue LEDs based upon an age of an end user viewing the display.

2. The information handling system of claim 1 wherein the proportion of blue light has a first proportion with a long blue wavelength spectrum when the age is below a threshold that is greater than the proportion when the age is above the threshold.

3. The information handling system of claim 2 wherein the first blue light LED illuminates at 460 nm or greater and the second blue light LED illuminates at 450 nm or less.

4. The information handling system of claim 3 wherein the first blue LED has a 90% PWM duty cycle and the second blue LED has a 10% PWM duty cycle when the age is below the threshold.

5. The information handling system of claim 4 wherein the first blue LED has a 50% PWM duty cycle and the second blue LED has a 50% duty cycle when the age is above the threshold.

6. The information handling system of claim 5 wherein the first and second blue LED are packaged together with silicon encapsulation.

7. The information handling system of claim 1 further comprising:
   a camera operable to capture an image of an end user viewing the display; and
   non-transitory memory storing instructions that when executed cause a determination of the age of the end user viewing the display.

8. The information handling system of claim 1 further comprising:
   a first set of blue LEDs that illuminate at a constant current to generate a first blue light spectrum when the end user has less than a first age; and a second set of blue LEDs that illuminate at a constant current to generate a second blue light spectrum when the end user has greater than the first age.

9. The information handling system of claim 1 further comprising a portable housing, the processor, memory and display included in the portable housing.

10. A method for presenting visual images at a display illuminated with a backlight, the method comprising:
   generating illumination with the backlight at a first proportion of a first blue wavelength and second blue wavelength;
   detecting an age of a view of the display; and
   in response to the age, generating illumination with the backlight at a second proportion of the first blue wavelength and second blue wavelength.

11. The method of claim 10 wherein the age is less than a threshold age and the second proportion has a greater amount of longer blue wavelength light than the first proportion.

12. The method of claim 10 wherein the age is greater than a threshold age and the second proportion has a greater amount of shorter blue wavelength than the first proportion.

13. The method of claim 10 further comprising detecting the age with a camera that captures a visual image of the end user.

14. The method of claim 10 further comprising setting the first proportion and second proportion by changing the pulse width modulation of current to a first set of LEDs having the first blue wavelength and a second set of LEDs having the second blue wavelength.

15. The method of claim 10 further comprising setting the first proportion and second proportion by changing the number of a first set of LEDs having the first blue wavelength and a second set of LEDs having the second blue wavelength that receive a constant current.

16. A display comprising:
   a liquid crystal display panel operable to generate visual images with an array of liquid crystal pixels;
   a backlight operable to illuminate the array of liquid crystal pixels, the backlight having plural light emitting diodes to generate illumination including at least a first blue LED illuminating in a first blue spectrum and a second blue LED illuminating in a second blue spectrum; and
   a scalar that commands the first and second blue LEDs to adjust a proportion of blue light output from the first and second blue LEDs based upon an age of an end user viewing the display.

17. The display of claim 16 wherein the proportion of blue light has a first proportion with a long blue wavelength spectrum when the age is below a threshold, the first proportion is greater than a second proportion when the age is above the threshold.

18. The display of claim 17 wherein the scalar commands a first PWM of the first LED when the age is below a threshold and a second PWM of the first LED when the age is above the threshold.

19. The display of claim 17 wherein a first of the first and second blue LEDs operate at a constant current to produce the first proportion of blue light and a second set of the first and second blue LEDs to operate at a constant current to produce the second proportion of blue light.

20. The display of claim 16 further comprising:
   a camera operable to capture an image of an end user viewing the display; and
   non-transitory memory storing instructions that when executed cause a determination of the age of the end user viewing the display.

* * * * *